Figure 3:
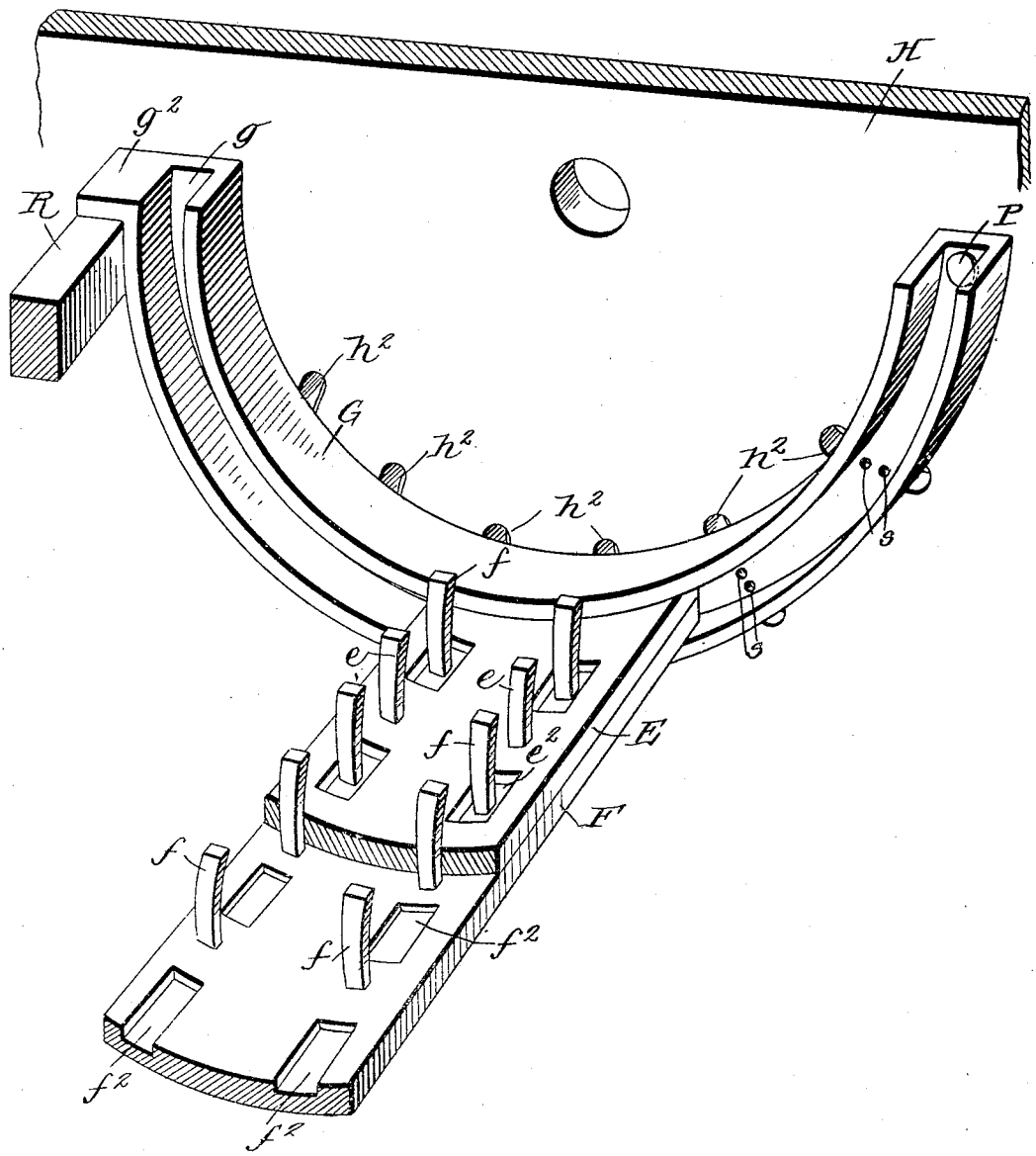

W. L. HAY.
CONCAVE FOR THRESHING MACHINES.
APPLICATION FILED MAY 26, 1909.
948,277.
Patented Feb. 1, 1910.
2 SHEETS—SHEET 1.
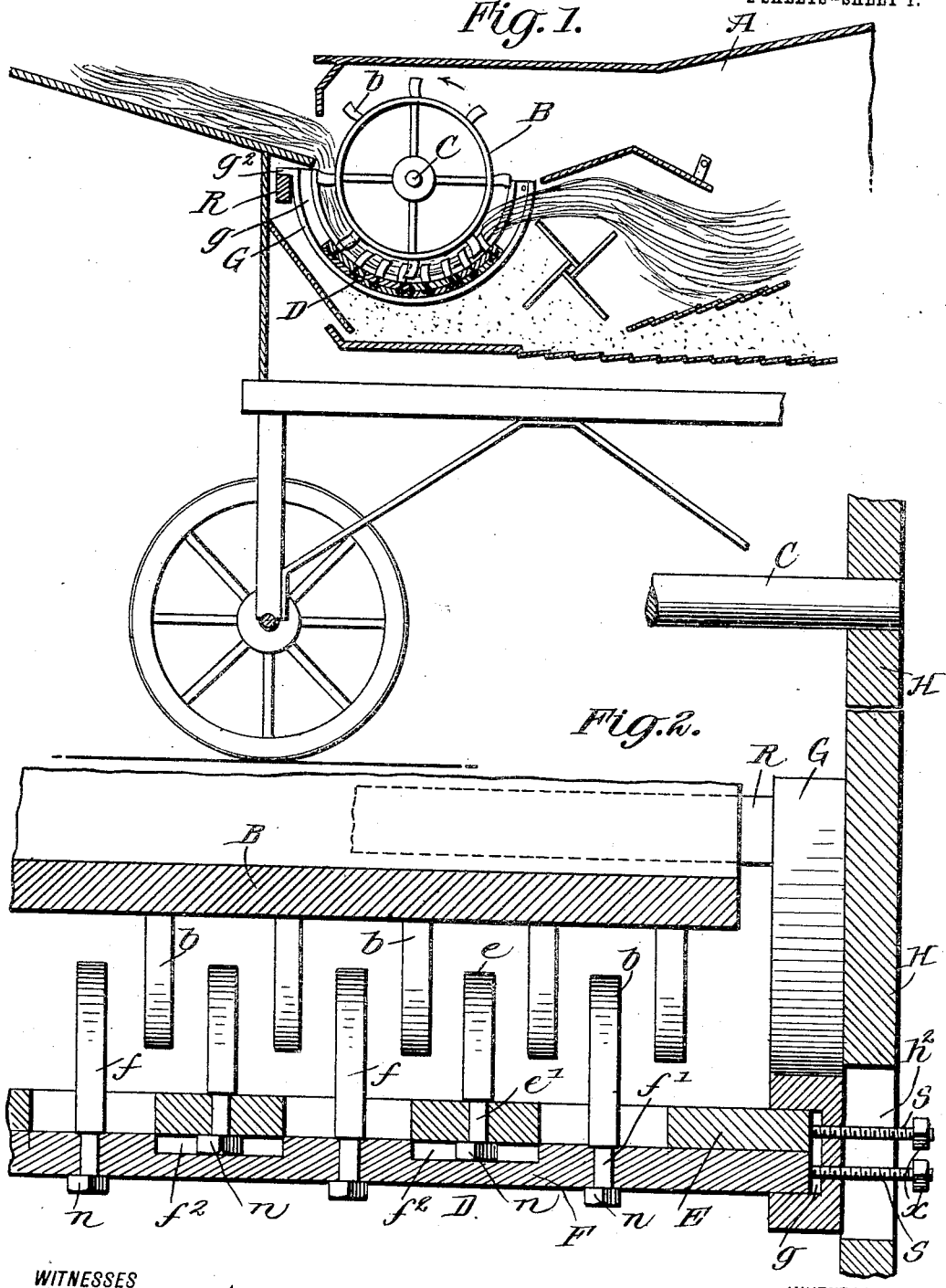
WITNESSES
Samuel E. Wade
L. H. Stanley
INVENTOR
WILLIAM L. HAY
BY Munn & Co.
ATTORNEYS

W. L. HAY.
CONCAVE FOR THRESHING MACHINES.
APPLICATION FILED MAY 26, 1909.

948,277.

Patented Feb. 1, 1910.
2 SHEETS—SHEET 2.

WITNESSES
Samuel E. Wade
L. A. Stanley

INVENTOR
WILLIAM L. HAY
BY Munn & Co.
ATTORNEYS

UNITED STATES PATENT OFFICE.

WILLIAM LAFAYETTE HAY, OF FRANKLIN, TENNESSEE.

CONCAVE FOR THRESHING-MACHINES.

948,277. Specification of Letters Patent. Patented Feb. 1, 1910.

Application filed May 26, 1909. Serial No. 498,441.

*To all whom it may concern:*

Be it known that I, WILLIAM LAFAYETTE HAY, a citizen of the United States, and a resident of Franklin, in the county of Williamson and State of Tennessee, have made certain new and useful Improvements in Concaves for Threshing-Machines, of which the following is a specification.

My invention relates to improvements in concaves for threshers of all kinds and it consists in the constructions, arrangements, and combinations of parts herein described and claimed.

In most threshing machines the teeth of the cylinder within the concave alternate with similar teeth on the concave itself and these teeth are set in such relation that the grain is stripped from the straw in the passage therethrough. It often happens that one tooth on the concave will strike against a tooth on the cylinder thereby interfering with the operation of the device and necessitating the partial dismantling of the machine in order to force the engaging teeth apart to permit the proper working of the device. This results in great inconvenience and a consequent loss of the time needed to make the readjustment. Sometimes the cylinder may be adjusted longitudinally of the concave so that the engaging teeth will clear each other but this adjustment often results in the engagement of the next pair of teeth or some other teeth and leaves the device in the same condition as before.

An object of my invention is to provide a concave having adjustable sections so that one of the sections may be shifted to disengage the teeth without disturbing the relative position of the teeth immediately adjacent.

A further object of my invention is to provide simple means for effecting the adjustment.

Further objects and advantages will appear in the following specification and the novel features of the device will be particularly pointed out in the appended claims.

My invention is illustrated in the accompanying drawings in which—

Figure 1 represents a section through a portion of a threshing machine showing the location of the cylinder and the concave. Fig. 2 is a longitudinal section showing a portion of the concave and cylinder. Fig. 3 is a perspective view of a portion of the concave showing the means for adjustment.

Referring now to Fig. 1, A denotes in general a threshing machine which is provided with a cylinder B having teeth $b$ on its periphery. The cylinder B is journaled on a central shaft C and is arranged to rotate in the direction shown by the arrow, being turned by any suitable means.

Below the cylinder and in close proximity thereto is the concave which I have denoted in general by D. The concave is made up of a series of sections E and F running longitudinally of the cylinder and supported at their ends by the arc-shaped member G which is pivotally secured at one end to a side member H by means of a pin or bolt P. The other end has a flange $g^2$ which rests on a bar R arranged to be moved by any suitable means to cause the member G to swing about the pivot P. The arc-shaped member G is provided with a concentric groove $g$, (see Figs. 2 and 3) in which the sections E and F are held. While I have shown in the figure four sets of these double sections E and F, it is obvious that more or less might be used as occasion demands.

The construction of the sections E and F is clearly shown in Figs. 3 and 4. These members are arc-shaped to fit the groove $g$ and the member E lies within the member F. The inner member E is provided with a series of inwardly projecting teeth $e$ while the outer member F is provided with a similar series of teeth $f$. The teeth $f$ are arranged to project through rectangular openings $e^2$ in the inner member E as clearly shown in Fig. 3. The teeth E and F have reduced portions $e'$ and $f'$ arranged to enter openings in their respective plates and are held therein by means of nuts on the threaded ends $n$ of the reduced portions. In order to accommodate the nuts for the teeth $e$, I provide the recesses $f^2$ in the outer plate $f$ as clearly shown in Figs. 2 and 3.

At the ends of the sections E and F are the adjusting screws S and S′ which pass through threaded openings $s$ in the arc-shaped member G. These screws extend through slots $h^2$ in the side members H as clearly shown in Fig. 2. The construction of the opposite end of the concave is similar to that described and hence needs no further description, the opposite end being provided with adjusting screws and the opposite side member having slots similar to $h^2$.

From the foregoing description of the various parts of the device the operation thereof may be readily understood.

The object of the invention as has been before stated, is to permit an adjustment of the teeth on the concave with respect to those on the cylinder. If now a tooth on the concave begins to strike against one on the cylinder during the revolution of the latter it will not be necessary to dismantle the machine to make an adjustment. One or the other of the sections E or F may be moved to free the contacting teeth and permit the cylinder to revolve freely. Thus if a tooth on one of the inner sections E should strike, the screw S on one side of the machine will be loosened while the opposite screw will be tightened, thereby shifting the section E longitudinally of the direction of the cylinder and freeing the engaging tooth. It will be seen that only the alternate teeth on the section E will be moved and that therefore the teeth of the concave on either side i. e. the teeth on the section F will remain in their initial positions. It will then be seen that there is not much liability of the striking of teeth on the concave and cylinder after the adjustment is made.

Obviously my improved form of concave might be used for any kind of a threshing device in which a series of teeth on the concave acts with a series of teeth on a cylinder in a threshing operation. Thus it might be used in a pea huller or other similar device. The slots $h^2$ permit the adjustment of the teeth of the concave toward and away from the teeth of the cylinder. This adjustment is secured in the ordinary manner by a movement of the bar B which will swing the concave on its pivot P.

I claim:

1. In a threshing machine, a cylinder provided with teeth, and a concave comprising a plurality of sets of plates, each set having a slotted inner plate and a recessed outer plate, teeth on both plates, the teeth on the outer plate being arranged to pass through the slots on the inner plate and the ends of the teeth on the inner plate being arranged to project into the recesses on the outer plate, and means for adjusting either plate relatively to the other and to the cylinder.

2. In a threshing machine, a concave comprising an arc-shaped member provided with a concentric groove, a plurality of sets of plates adjustably supported in said groove, each set consisting of an inner slotted plate and an outer recessed plate, teeth on each of said plates, the teeth on the outer plate being arranged to project through the slots on the inner plate and the teeth on the inner plate being arranged to extend into the recesses on the outer plate and adjusting screws carried by said arc-shaped member for moving either of said outer or inner plates relatively to one another.

3. In a threshing machine, a cylinder provided with teeth on its periphery, slotted side members for rotatably supporting said cylinder, an arc-shaped support pivotally mounted on said side member and provided with a concentric groove, a series of inner and outer plates carried in said groove, each of said plates being provided with teeth and independent adjusting screws carried by said arc-shaped support and arranged to project through the slots in said side member for adjusting each of said plates independently of the other.

4. In a threshing machine, a concave comprising a plurality of sets of plates, each set having an inner and an outer plate provided with teeth, the teeth of the outer plate extending through slots in the inner plate, and means for moving either plate independently of the others and for securing it in its adjusted position.

WILLIAM LAFAYETTE HAY.

Witnesses:
S. M. FLEMING,
CHAPMAN ANDERSON.